United States Patent Office 3,554,718
Patented Jan. 12, 1971

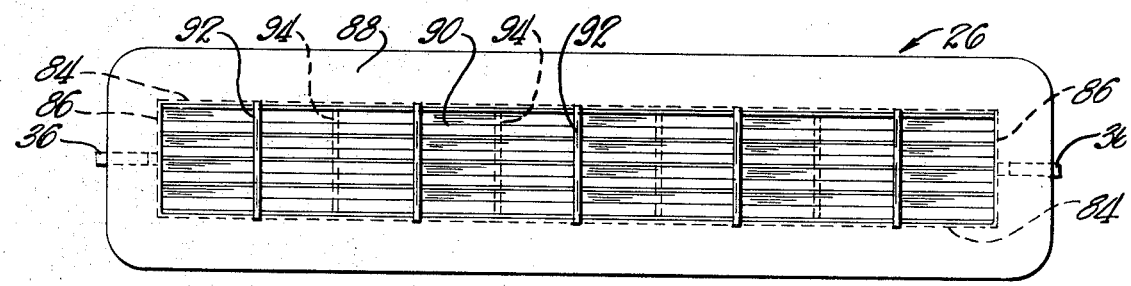
Fig. 2
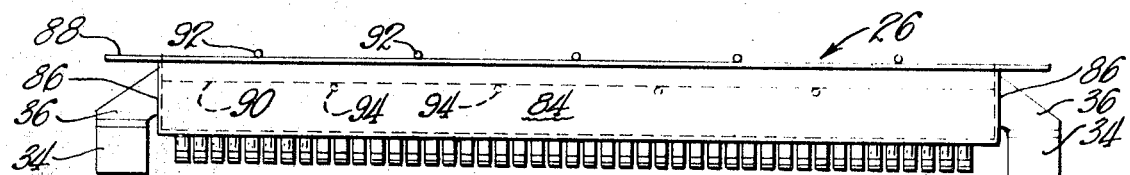
Fig. 3
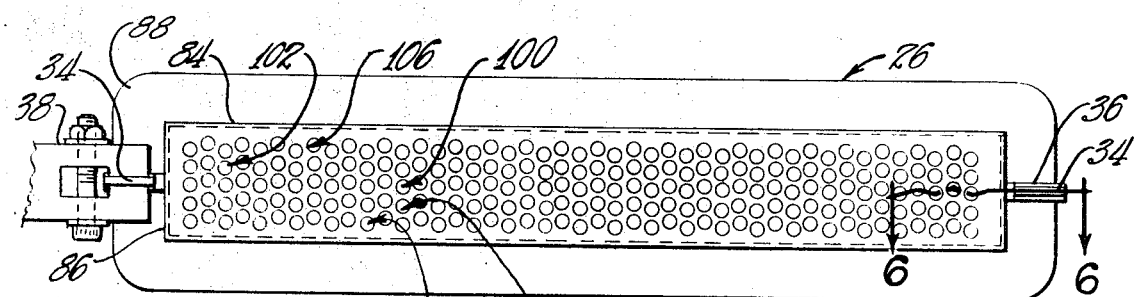
Fig. 4
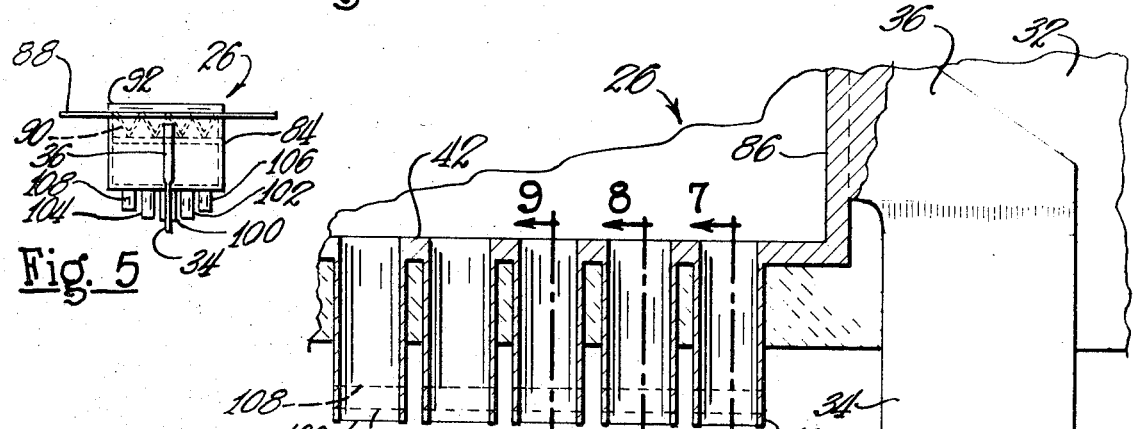
Fig. 5
Fig. 6

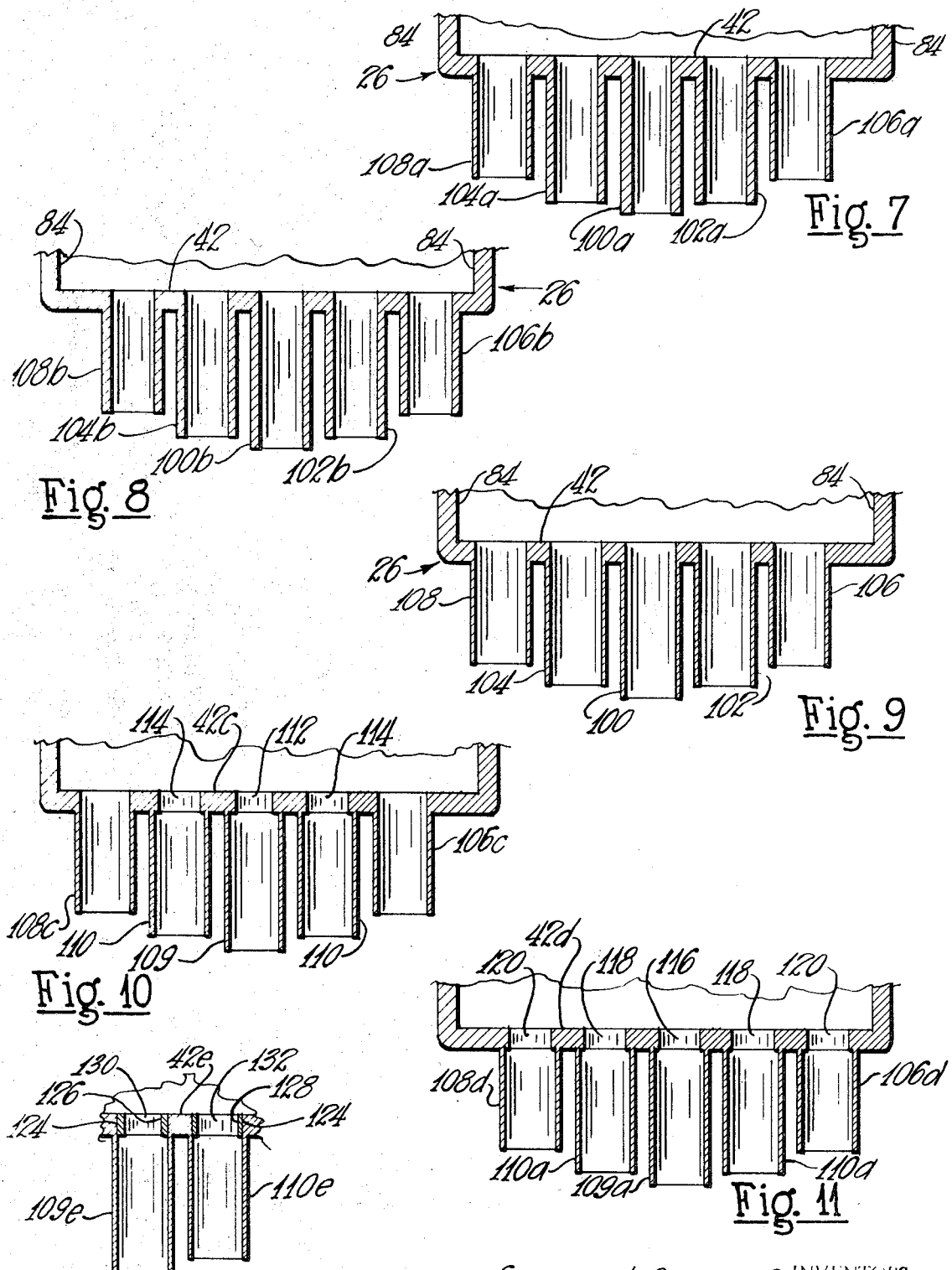

3,554,718
APPARATUS FOR FEEDING STREAMS OF HEAT-SOFTENED MINERAL MATERIAL
Charles J. Stalego, Newark, and Samuel D. Philipps, Granville, Ohio, assignors to Owens-Corning Fiberglas Corporation, a corporation of Delaware
Filed Dec. 29, 1967, Ser. No. 694,581
Int. Cl. C03b 37/02
U.S. Cl. 65—1                                   2 Claims

ABSTRACT OF THE DISCLOSURE

The disclosure embraces a method of correlating the characteristics of passages in a stream feeder or bushing for flowing glass streams and arrangement of tubular projections of different lengths providing differential surface areas defining the passages for the dissipation or transfer of heat from the glass to promote the delivery from the passages of streams of glass having substantially uniform viscosity characteristics.

---

This invention relates to method of and apparatus for flowing groups of streams of heat-softened filament-forming material and more especially to a stream feeder and method of flowing streams of heat-softened glass for attenuation to primary filaments suitable for further processing.

A method which has been employed in forming fine, blast-attenuated fibers of glass involves flowing a group of streams of glass from a stream feeder or bushing and attenuating the streams to primary filaments by engaging the filaments with pull rolls, the primary filaments so formed being continuously advanced into a high temperature gaseous blast, the heat of the gases of the blast softening the advancing ends of the primary filaments and the velocity of the gases of the blast attenuating the softened glass to fine discontinuous fibers. An apparatus of this character is disclosed in Stalego et al. Pat. 3,002,224. The feeder construction employed in such method is fashioned with tubular projections or tips on the floor of the feeder or bushing wherein the tips are all of the same length. It has been conventional practice to flow electric current through the feeder or bushing to maintain the glass or other filament forming material at temperatures fostering glass flow through passages in the projections to provide the streams for attenuation. It has been found that the heat pattern or temperature profile of the glass in the stream feeder or bushing varies in different regions of the feeder. In elongated feeders wherein the current flows lengthwise through the glass in the feeder, the lengthwise central region of the glass in the feeder is of a higher temperature than that of the regions of the glass laterally of the central region.

Under such conditions the glass at the lengthwise central region is of lesser viscosity than the glass adjacent such region and hence the glass delivered from the central region tends to flow at a higher rate through delivery passages because of the lesser viscosity resulting in streams from all of the passages of nonuniform characteristics. Glass streams of nonuniform viscosities result in the formation of primary filaments of varying sizes and such variations in filament diameters may be several thousandths of an inch. Where primary filaments of varying sizes are delivered into a gaseous attenuating blast of a temperature to soften the glass and attenuate the softened glass to fine discontinuous fibers, the gaseous blast must be regulated so as to attenuate the coarsest of the primary filaments or a cold slug develops. The throughput of glass of lesser viscosity at the higher temperature central region of the feeder is therefore greater than the throughput of glass at regions each side of the central region, and filaments formed from the glass at the central region tend to be of larger diameters because the pull rate is the same for all of the filaments. The efficiency of throughput of the feeder is thus impaired. As the combustion burner providing the gaseous blast must be regulated to attenuate the coarsest primary filaments, an increased amount of fuel is required with a consequent increase in the cost of producing fibers attenuated from primary filaments of varying sizes and the fibers so formed are of nonuniform size.

The present invention embraces a method of correlating the characteristics of the stream flow passages for glass streams to promote the delivery of the glass streams such that primary filaments attenuated from the streams of glass are of substantially uniform size.

Another object of the invention embraces a method of delivery streams of heat-softened glass from a supply in which temperature variations exist by flowing the glass along guide surfaces of varying areas for transferring or dissipating heat from the glass whereby the viscosity of the glass exiting from the guide surfaces is substantially uniform promoting the formation of streams of uniform size which, when attenuated, result in filaments of substantially uniform size.

Another object of the invention is the provision of an elongated stream feeder or bushing for flowing glass streams wherein the tubular projections depending from the feeder floor providing glass flow passages from the lengthwise central region and regions laterally thereof are fashioned to provide varying surface areas for heat transfer from the glass whereby all of the tubular projections have substantially the same throughput of glass.

Another object of the invention resides in the provision of a stream feeder or bushing of elongated shape having lengthwise rows of tubular projections providing glass flow passages wherein the projections for flowing glass from the lengthwise central zone of high heat concentration in the glass in the feeder are fashioned to provide increased area of contact or heat transfer with the glass flowing through the passages in the projections to thereby increase the viscosity of the glass delivered from the projections of increased area whereby the glass flow or throughput of streams from the feeder is more uniform.

Another object of the invention is the provision of a stream feeder of elongated shape having a plurality of lengthwise arranged laterally spaced rows of tubular projections or orificed tips wherein the projections of the rows laterally of the central row are of decreased lengths whereby heat is dissipated or transferred from the glass in the rows of different lengths at different rates whereby to render more uniform the streams delivered from the passages of the tubular projections of all of the rows.

Another object of the invention resides in a stream feeder of elongated rectangular shape wherein a zone of heat concentration is existent lengthwise of the central region of the glass in the feeder, the feeder floor being fashioned with rows of tubular stream flow projections lengthwise of the feeder wherein the projections of rows from the central region of the floor to the side regions are of lengths to provide passage surfaces of different areas for contact with the glass to modify the viscosities of the bodies of glass moving through the passages in the projections whereby to compensate for the nonuniform heat pattern or temperature profile in the glass in the feeder and provide streams of glass delivered from the passages of substantially uniform viscosity characteristics and promote substantially uniform throughput of glass through the passages of all of the projections.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIG. 2 is a top plan view illustrating one form of stream feeder of the invention;

FIG. 3 is a side elevational view of the stream feeder shown in FIG. 2;

FIG. 4 is a bottom plan view of the stream feeder shown in FIG. 2;

FIG. 5 is an end view of the stream feeder shown in FIG. 2;

FIG. 6 is an enlarged fragmentary detail sectional view taken substantially on the line 6—6 of FIG. 4;

FIG. 7 is a transverse sectional view taken substantially on the line 7—7 of FIG. 6;

FIG. 8 is a transverse sectional view taken substantially on the line 8—8 of FIG. 6;

FIG. 9 is a transverse sectional view taken substantially on the line 9—9 of FIG. 6;

FIG. 10 is a view similar to FIG. 7 illustrating a modified form of stream flow passages for a feeder;

FIG. 11 is a sectional view similar to FIG. 8 showing a further modified form of stream flow passages; and FIG. 12 is a fragmentary sectional view illustrating a form of glass flow metering means for stream delivery passages of a stream feeder.

Figure 1:
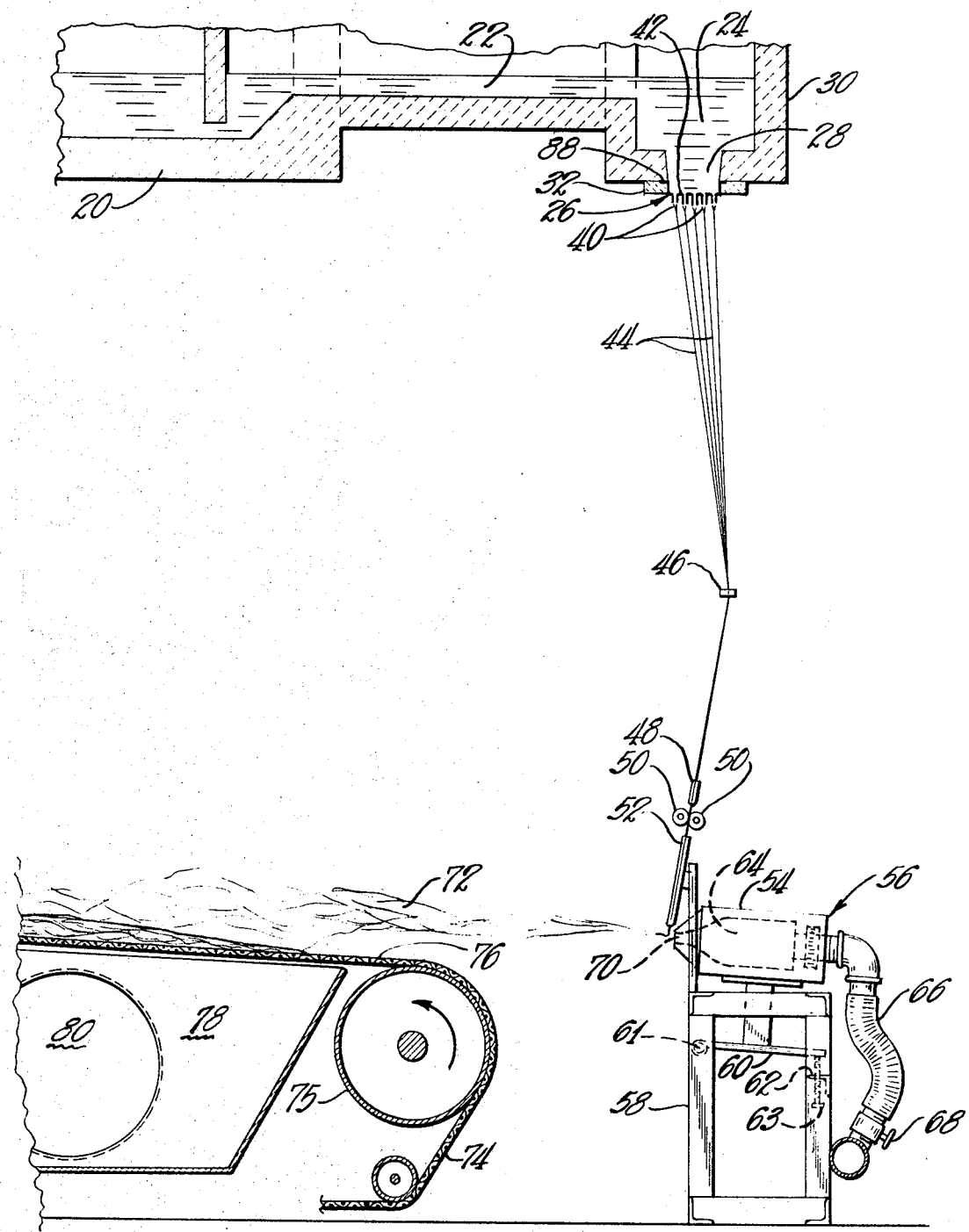
FIG. 1 is a side elevational view, partly in section, of an apparatus for attenuating primary filaments from streams of glass delivered from a stream feeder of the invention and forming blast attenuating fibers from the primary filaments.

While the apparatus illustrated is particularly usable in carrying out the method of the invention of flowing streams of glass for attenuation into primarmy filaments, it is to be understood that the method and apparatus of the invention may be utilized for flowing streams of glass for attenuation to fine filaments or for flowing streams of other heat-softened filament-forming materials.

Referring to the drawings and initially to FIG. 1, there is illustrated an apparatus or arrangement for flowing streams of heat-softened glass or other heat-softened filament forming material from a stream feeder or bushing embodying the invention, the streams being attenuated into primary filaments or primaries which are delivered into a high temperature gaseous blast for attenuation to fine discontinuous or discrete fibers.

The arrangement shown in FIG. 1 is inclusive of a glass melting and refining furnace or tank 20 from which molten glass is delivered through connecting forehearth channels 22 and 24 into an elongated rectangularly shaped stream feeder or bushing 26 disposed in registration with a well 28 fashioned in a forehearth section 30. The stream feeder 26 is secured to the forehearth construction 30 by refractory 32, shown in FIGS. 1 and 6, the refractory embracing the stream feeder to minimize heat losses. One or more of the stream feeders 26 may be provided depending upon the number of gaseous blast fiber attenuating units employed, there being a stream feeder provided for each blast attenuating unit.

The glass in the stream feeder is heated by electric current. Terminal lugs 34 are provided at the ends of the elongated feeder or bushing 26. Current conductors (not shown) are provided with conventional clamps 38, one of which is shown in FIG. 4, for connection with the terminal lugs 34 at the ends of the stream feeder, the terminal lugs 34 having thickened portions 36 welded to the end walls 36 at their central regions to facilitate high current flow through the stream feeder and the glass contained therein. The stream feeder is formed of high temperature resistant metal or alloy such as an alloy of platinum and rhodium or the like.

Streams 40 of glass flow through passages provided by tubular projections or orificed tips arranged in lengthwise rows provided on or depending from the floor 42 of the stream feeder 26, the streams being attenuated to primary filaments or linear bodies 44.

The primary filaments 44 attenuated from all of the streams are oriented into a planar row with the primary filaments maintained in spaced relation by a comb bar 46 of conventional construction. The filaments 44 are directed through a guide 48 and are engaged by pull rolls 50 driven at a substantially constant speed by a motor (not shown) in a conventional manner.

A second guide means 52, disposed beneath the pull rolls 50, directs the primary filaments into a horizontally projected high temperature, high velocity gaseous blast delivered from an internal combustion burner 54, of a fiber attenuating unit 56. Where more than one stream feeder or bushing is employed, each flowing a group of streams of glass, a fiber-attenuating unit 56 is provided for each group. A frame 58 provides support means for the primary filament guides 48, 52 and the combustion burner 54.

The burner 54 is supported upon a supplemental frame or platform 60 mounted for pivotal movement upon a pin 61 for angularly adjusting the burner 54 to vary the direction of the gaseous blast projected from the burner. A bracket 62 carried by the frame 58 is equipped with a threaded member 63 for adjusting the burner 54. The pull rolls 50, guides 48 and 52 and the burner 54 are of the character shown in U.S. Pat. 3,002,224. The internal combustion burner 54 is fashioned with a confined combustion chamber or zone 64. A combustible mixture of fuel, gas and air is conveyed into the combustion chamber by tubular means 66, the volume or mixture being controlled by a valve means 68.

The combustible mixture is substantially completely burned within the combustion chamber 64, the gases of combustion undergoing great expansion in the chamber 64 and the intensely hot gases of combustion are projected at high velocities through a restricted orifice 70 providing a high temperature, high velocity blast engaging and softening the advancing primary filaments 44 and attenuating the softened glass of the filaments to fine discrete fibers 72.

Disposed forwardly of the blast attenuating unit 56 is an endless belt conveyor 74 supported upon rolls 75 in a conventional manner, one of the rolls being shown in FIG. 1. One of the rolls 75 is driven by motive means (not shown) to advance the upper flight 76 of the belt in the direction of movement of the blast, the fibers 72 being collected upon the conveyor flight 76. Disposed beneath the conveyor flight 76 is a walled chamber 78 connected by a pipe 80 with a suction blower (not shown) to establish reduced pressure in the chamber 78 and thereby assist in collecting and retaining the fibers 72 on the conveyor.

A form of bushing or stream feeder 26 of the invention is illustrated in FIGS. 2 through 9. The stream feeder is of elongated rectangular shape having side walls 84 and end walls 86. The stream feeder is fashioned with a horizontal flange 88 secured to the upper regions of the side and end walls and extends outwardly therefrom. As shown in FIG. 1, the flange 88 is engaged by refractory 32 to secure the feeder or bushing 26 to the forehearth section 30.

Disposed in the upper region of the stream feeder 26 is a metal screen or filter 90 of an alloy of platinum and rhodium or other high temperature resistant metal, the screen 90 being preferably fashioned as a connected series of V-shaped configurations, the screen preventing entrance of stones or unmelted material into the feeder. The screen 90 is supported by transversely disposed members or rods 92 which are welded to the flange 88, and a lower row of members or rods 94 welded to the side walls 84 of the stream feeder.

The floor section or tip section 42 of the stream feeder is fashioned with lengthwise rows of tubular projections providing guide passages through which glass flows from the supply in the feeder forming glass streams 40. The flow of electric current lengthwise through the stream feeder or bushing 26 causes a concentration of heat and increased temperature in the glass at the central lengthwise region of the feeder, the temperature of the glass decreasing laterally from the central region toward the side walls 84 of the stream feeder.

The flow of electric current tends to establish a concentration of heat and increased temperature of the glass at the end regions of the stream feeder. Temperature variations in the glass in the feeder effect variations in the viscosity of the glass and, if the characteristics of the tubular projections or stream flow passages are substantially identical, the glass flow through the passages will not be uniform.

The glass at higher temperatures and hence of lesser viscosity flows at a higher rate than the flow rate of glass at a higher viscosity, resulting in nonuniform glass streams and primary filaments of varying sizes.

The invention embraces a method and arrangement of effecting transfer of heat from the glass in the tubular projections or passages in varying amounts or rates to promote the delivery from the passages of streams of glass of substantially the same viscosity so as to facilitate the formation of attenuated primary filaments or primaries of uniform size.

All of the streams are attenuated to primary filaments at the same linear speed, and if the glass in the passages is of varying viscosities a lesser amount of glass of higher viscosity flows through the adjacent passages reducing the throughput and resulting in decreased efficiency of fiber production because the combustible mixture for the burner producing the atenuating blast must be adjusted so that the blast will attenuate the coarsest of the primary filaments to discrete fibers.

As shown in FIG. 4, there are five lengthwise rows of tubular projections viz. a central row of projections 100, rows of projections 102 and 104 at each side and adjacent the central row, and outer rows of projections 106 and 108. The two transverse rows of tubular projections at the end regions of the stream feeder are illustrated respectively in FIGS. 7 and 8 and, as hereinafter explained, have particular characteristics for compensating for the nonuniform heat pattern or temperature profile of the glass in the feeder 26 at the end regions thereof. The remaining tubular projections are fashioned as illustrated in FIG. 9.

As will be seen from FIGS. 5 and 9, the tubular projections 100 of the central row lengthwise of the feeder are of uniform length and are appreciably longer than the projections 102 and 104 of the rows adjacent the central row of projections 100. The outer rows of projections 106 and 108 adjacent the rows of projections 102 and 104 are of lesser length than the projections of rows 102 and 104. In the arrangement shown in FIGS. 4 and 9 all of the projections except the projections in the two transverse rows at each end of the feeder have the same interior and exterior diameters.

The fashioning of the projections of the several rows of the lengths illustrated in FIG. 9 provide a method for transferring or dissipating heat from the glass moving through the passages of the projections at different rates or amounts by reason of the differences in surface areas of the projections exposed to the glass and to the atmosphere so that differential amounts of heat are withdrawn or dissipated from projections of different characteristics. The projections may be fashioned of an alloy of platinum and rhodium or other suitable high temperature resistant metal material.

It will be apparent from FIG. 9 that the glass guiding projections 100, being of greater length than the projections in the other rows, provide substantial surface areas of the metal of the projections to receive heat from the glass by conduction and radiation, and the exterior surface areas being greater than the exterior surfaces of projections of the other rows fosters the dissipation or transfer of heat from the glass in the passages to the ambient air at the exterior surfaces of the projections 100 of the central row to thereby reduce the temperature of the glass as it flows through the projections 100 and increase the viscosity of the glass.

Thus the glass of higher temperature at the central lengthwise region in the feeder flows through the central row of projections 100 and the viscosity of the glass exiting from the passages 100 is of a substantially increased viscosity. As shown in FIG. 9, the projections 102 and 104 of the rows of projections at each side and adjacent the central row of projections are appreciably shorter and hence the interior surface area of the passages of the projections 102 and 104 are of lesser area for heat transfer and conduction of heat from the glass in the passages 102 and 104.

As the glass in the feeder laterally of the central lengthwise region is of a lesser temperature than the glass at the central region, the temperature of the glass moving through the passages or projections 102 and 104 has the viscosity increased but not to the extent of the increase in viscosity of the glass moving through the central projections 100. By properly proportioning the lengths of the projections 100, 102 and 104, the viscosity of the glass exiting from the passages of these projections is substantially the same so that the throughput through the rows of projections 100, 102 and 104 is substantially uniform.

As shown in FIG. 9, the projections 106 and 108 of the outer rows are appreciably shorter than the rows of projections 102 and 104. The glass moving through the passages in the projections of the outer rows is adjacent lesser surface areas by reason of the shortened projections so that less heat is dissipated from the glass moving through the rows of projections 106 and 108.

As the temperature profile of the glass in the feeder at the regions adjacent the rows of projections 106 and 108 is of a temperature lower than the glass at the central region and at either side of the central region, the viscosity of the glass at such regions in the feeder is initially higher.

As the amount of heat transferred from the glass flowing through the passages of projections 106 and 108 is reduced, the viscosity of the glass exiting from the projections 106 and 108 is substantially the same as the viscosity of the glass exiting from the center row of projections 100 and the projections 102 and 104 of the intermediate rows. Thus, through this method, the throughput of glass through the projections 100, 102, 104, 106 and 108 is substantially uniform.

The difference in the lengths of the projections of the several rows may be varied depending upon the temperature profile transversely of the glass in the feeder. For example, if the temperature at the central lengthwise region of the feeder is only slightly higher than the temperature of the glass adjacent the proejctions 106 and 108, then the differences in the lengths of the projections of the respective rows will be less than a condition wherein the central lengthwise region of the glass is at a temperature substantially higher than that of the glass adjacent the side walls.

As an example of the differentials in lengths of projections of the several rows, the length of the projections 100 may be about three-fourths of an inch from the inside floor surface of the feeder to the tips or ends of the projections.

Where the glass in the central lengthwise region in the feeder is at a substantially higher temperature than the glass adjacent the side walls, the lengths of the projections 102 and 104 of the rows adjacent the central row may be from .020" to .080" less than the length of the projections 100.

As the glass above and adjacent the rows of projections 106 and 108 is of a temperature substantially less than the temperature of the glass at the central region, the projections 106 and 108 may be from .100" to .175" less than the length of the projections 102 and 104. However the lengths of the projections of the several rows are dependent upon the temperature differentials transversely of the feeder and may be varied so that the metal surface area for transferring heat away from the glass in the several projections is such that the throughput of glass of each of the passages is substantially the same.

Another factor bearing upon the lengths of the projections is the resistance to glass flow along the surfaces defining the passages of the projections. The resistance to glass flow through a short length passage is less than the flow resistance through a longer passage. The flow resistance is a factor in determining the differential in lengths of the projections of the several rows. The diameters of the projections are preferably the same and may be from .175" to .225" and attain satisfactory primary filaments.

FIG. 7 is a transverse sectional view through the transverse row of tubular projections at an end region of the feeder where a zone of heat concentration is encountered. In FIG. 7, the diameter of the passage in each of the projections 100a of the central lengthwise row is less than the diameters of the passages in the projections 102a and 104a of the rows adjacent and at each side of the central row.

As the glass in the corner regions of a stream is at a reduced temperature, the diameters of the passages in the corner projections 106a and 108a are greater than the diameters of the passages in projections 102a and 104a. The differences in the diameters are dependent upon the temperature differentials transversely of the feeder in the region of this transverse end row of projections.

FIG. 8 is a sectional view through the transverse row of projections next adjacent the end row of projections shown in FIG. 7. The dimensions of projections 100b may be substantially the same as the dimensions of projections 100a of FIG. 7. While the lengths of projections 102b and 104b of the adjacent rows are shorter to compensate for temperature differentials at this region of the glass in the feeder, further compensation may be attained by slightly reducing the diameters of the passages in the projections 102b and 104b if this is found desirable to supplement the compensation attained by fashioning these projections of lesser length than the projections 100b.

The diameters of the passages in projections 106b and 108b may be slightly less than the diameters of passages in the projections 106a and 108a shown in FIG. 7, because the glass in the feeder adjacent the projections 106b and 108b is of higher temperature than the glass in the corner regions of the stream feeder adjacent tubular projections 106a and 108a.

Thus, while compensation for the nonuniform temperature profile of the glass adjacent the several rows of projections except the two rows at each end of the feeder may be satisfactorily accomplished by proportioning the lengths of the projections of the several rows as above described, it is found that it is essential to modify the diameters of the two transverse rows at each end of the feeder as explained in reference to the tubular projections shown in FIGS. 7 and 8 to provide streams of glass of uniform viscosity.

FIG. 10 is a sectional view through a transverse end row of projections illustrating a modified arrangement for metering glass flow through the tubular projections. The projections 106c and 108c and the passages therein at the corners of the feeder are of the same character as the projections 106a and 108a in FIG. 7. The tubular projections 109 of the central lengthwise row and the tubular projections 110 of the rows at each side of the central row may be of the same internal diameters as the diameter of the tubular projections 106c and 108c.

In this form of stream feeder the floor 42c of the feeder is fashioned with a glass metering passage 112 in registration with each of the projections 109 of the central lengthwise row of projections. The diameter of the metering passage 112 in the transverse row of projections at each end of the feeder is of lesser diameter than the internal diameter of the projection 109. The feeder flow is fashioned with glass metering passages 114 in registration with the tubular projections 110 of the transverse row of projections at the ends of the feeder.

The diameters of the metering passages 114 are slightly greater than the diameter of the metering passage 112 as the glass in the feeder adjacent the passages 114 is of lesser temperature and hence of higher viscosity, the larger passages 114 providing for flow of the glass at these regions substantially equal to the flow rate of lesser viscosity glass through the metering passage 112 so that the throughput at the transverse end rows of projections is substantially uniform.

The tubular projections 106c, 108c, 109 and 110 may be fashioned of tubing of uniform wall thickness so that their internal diameters are of the same size. The tubes may be welded to the feeder floor, the metering of the glass being accomplished through the metering passages 112 and 114. The passages of the corner projections 106c and 108c may not require restriction because of the reduced temperature of the glass at the corner regions of the stream feeder. By correlating the sizes of the metering passages and the lengths of the projections, the viscosity of the bodies of glass exiting from the projections is substantially uniform.

FIG. 11 is a transverse sectional view through the second of the transverse rows of projections near the end regions of the feeder embodying glass metering passages in the feeder floor in registration with the tubular projections. The central projection 109a is in registration with a glass metering passage 116 in the feeder floor 42d, the metering passage 116 being of slightly greater diameter than the metering passage 112 in FIG. 10 because of the slightly reduced temperature of the glass spaced from the end of the feeder and adjacent the metering passage 116.

The feeder floor is fashioned with metering passages 118 in registration with the tubular projections 110a which may be of the proper diameter to meter the glass flowing therethrough at substantially the same throughout or rate as the metering passage 116. Metering passages 120 in registration with tubular projections 106d and 108d are of a slightly larger diameter than the diameter of the metering passages 118 by reason of the slightly reduced temperature and hence higher viscosity of the glass adjacent the side walls of the feeder.

Thus the metering passages 116, 118 and 120 of the transverse row of projections next adjacent each transverse end row and the lengths of projections are correlated in size so that the throughput of glass through the metering passages and the passages in the tubular projections are substantially uniform so that the viscosity of the bodies of glass exiting from the projections is the same from all of the passages.

The remaining passages of projections of the lengthwise rows are in registration with metering passages in the feeder floor of diameters to provide a uniform throughput of glass therethrough so that the bodies of glass exiting from all of the tubular projections on the feeder are of substantially the same viscosity so that primary filaments attenuated from the bodies or streams are of substantially uniform size.

The tubular projections of the character shown in FIGS. 10 and 11 may be fashioned of lengths of one size of metal tubing, such as an alloy of platinum and rhodium, or other metal or alloy suitable to withstand the high temperatures of the glass, the tubes being welded to the floor of the feeder. With such arrangement, the flow rate or throughput of glass is metered or controlled through the metering passages in the feeder floor and in conjunction with the surface areas of the tubular projections transferring or dissipating heat from the glass moving therethrough to the surrounding atmospheres, bodies or streams of glass of substantially uniform viscosity are delivered from the feeder.

FIG. 12 illustrates another method and arrangement providing for metering the glass throughput of the tubular projections utilizing lengths of uniform walled tubing for the projections. The feeder floor 42e is fashioned with bores 124 in registration with tubular projections 109e and 110e, the bores 124 being preferably of the same diameter as the interior diameter of the projections, the ends of the projections being welded to the feeder floor. In this form of construction, the metering passages are provided by annular members 126 and 128 disposed in the bores 124 and welded to the feeder floor 42e.

The interior diameters of the metering passages 130 and 132 are of a size to meter the flow of glass through the tubular projections, the sizes of the metering passages being dependent upon the heat pattern or temperature profile of the glass in the feeder adjacent the respective metering passages. The other projections on the stream feeder are fashioned in the same manner, the annular members having interior diameters of the proper size to regulate and control the throughput of glass through all of the projections. In the construction shown in FIG. 12, the tubular projections are fashioned from a single size of metal tubing and the bores 124 in the feeder floor, in registration with the passages provided by the tubular projections, may be of the same size as the metering of the glass is accomplished by the sizes of passages defined by the anular members 126 and 128 and bodies or streams of glass of uniform viscosity attained by transfer or dissipation of heat through the walls of the tubular projections.

The method and the forms of apparatus for carrying out the method enable the exiting of glass bodies or streams of substantially uniform viscosity through the transfer to the ambient atmosphere of heat from the glass moving through the passages provided by the tubular projections whereby variations in the temperature profile or heat pattern of the glass in the feeder are compensated so that filaments of substantially uniform diameters are attenuated from the bodies or streams of glass delivered from a feeder.

It is apparent that, within the scope of the invention, modifications and different arrangements may be made other than as herein disclosed, and the present disclosure is illustrative merely, the invention comprehending all variations thereof.

We claim:

1. Apparatus for processing glass comprising, in combination, a stream feeder containing molten glass, said stream feeder having a floor section provided with lengthwise arranged rows of glass flow openings, tubular walled projections depending from the floor section in registration with the openings of each row, the wall area of the projections of a central row being greater than the wall area of projections of the outermost rows laterally of the central row, the wall area of projections of the rows intermediate the central and outermost rows being less than the wall area of the projections of the central row and greater than the wall area of the projections of the outermost rows, the flow openings of the central row in the feeder floor section adjacent the region of glass of higher temperature being of smaller diameters than the diameters of the flow openings of the row at each side of the central row adjacent the regions of the glass of lesser temperature.

2. Apparatus for processing glass comprising, in combination, a stream feeder containing molten glass, said stream feeder having a floor section provided with five lengthwise arranged rows of glass flow openings, tubular projections depending from the floor section in registration with the flow openings of each row, the projections of the central row being of greater length than the projections of outermost rows laterally of the central row, the projections of the rows intermediate the central and outermost rows being of a length shorter than the projections of the central row and longer than the projections of the outermost rows, the flow openings of the central row in the feeder floor section adjacent the region of glass of higher temperature being of smaller diameters than the diameters of the flow openings of the row at each side of the central row adjacent the regions of the glass of lesser temperature.

References Cited

UNITED STATES PATENTS

| 2,706,365 | 4/1955 | Stalego | 65—12 |
| 3,002,226 | 10/1961 | Warthen | 65—2X |

S. LEON BASHORE, Primary Examiner

R. L. LINDSAY, Assistant Examiner

U.S. Cl. X.R.

65—12, 16